Patented Sept. 7, 1948

2,448,714

UNITED STATES PATENT OFFICE 2,448,714

DITHIO ACID DERIVATIVES

Albert F. Hardman, Akron, Ohio, assignor to Wingfoot Corporation, Akron, Ohio, a corporation of Delaware No Drawing. Application January 5, 1944, Serial No. 517,108

4 Claims. (Cl. 260—345)

This invention relates to amine salts of dithiofuroic acid and their preparation. These materials are useful as accelerators of the vulcanization of rubber. They are particularly useful in the vulcanization of the various synthetic rubbers now being developed commercially, it often being difficult to vulcanize these synthetic rubbers efficiently by using those accelerators which have proved to be most effective with natural rubber.

The amine dithiofuroates may be prepared by reacting the desired amine with dithiofuroic acid. This reaction may be carried out in the common organic solvents or in water or even in the absence of solvent by direct addition of the amine to the acid.

Salts of certain amines may also be prepared by dissolving ammonium dithiofuroate in water and adding to the solution the amine corresponding to the desired salt. The amine salt precipitates out and may be readily separated, for example by filtration. The amines which may be used in this method include the primary aliphatic amines, the secondary aliphatic amines, the primary aromatic amines and the secondary N-aliphatic-N-aromatic amines. The amine salts thus prepared may be represented by the structural formula

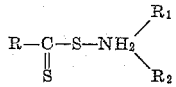

in which R is furyl, R₁ is selected from the group consisting of aliphatic and aromatic radicals and R₂ is selected from the group consisting of aliphatic radicals and hydrogen. This method is illustrated by the following example:

Example 1

Eighteen grams of ammonium dithiofuroate were dissolved in 90 cc. of water, the solution was filtered and 10 grams of piperidine were added thereto with stirring. Crystals separated at once. The mass was cooled, the crystals were filtered off, washed and dried. The purple-red product weighed 18.5 grams and melted at 107° C.

If desired, the ammonium salt may be prepared in situ, for example by treating an alkali metal salt, such as the sodium salt, with an equivalent of ammonium chloride or ammonium sulfate. The amine salt is then prepared as before by adding the desired amine.

Primary aliphatic amine salts of dithiofuroic acid may be prepared by reacting the desired amine with furfural, sulfur and hydrogen sulfide as illustrated in the following example:

Example 2

Forty-eight grams of furfural, 20 grams of sulfur, 50 grams of cyclohexylamine and 200 cc. of benzene were mixed. The mixture was stirred rapidly and a stream of hydrogen sulfide was passed into it, the mass being cooled slightly to maintain a temperature of about 45-50° C. Red crystals quickly began to separate. After the heat of reaction began to subside, the introduction of hydrogen sulfide was continued for an additional ten minutes. The crystals were then filtered off, washed with benzene and dried. The product consisted of 117 grams of bright red crystals which melted at 120–121° C. This represented 97% of the theoretical yield.

Another method for preparing the amine salts is to dissolve ammonium or sodium dithiofuroate in water and add an aqueous solution of an amine salt, such as the hydrochloride or sulfate, to produce the amine dithiofuroate.

Representative examples of amines which may be employed to produce dithiofuroates are methylamine, ethylamine, the propylamines, the butylamines, the amylamines, n-octylamine, allylamine, cyclohexylamine, the ac-tetrahydronaphthylamines, furfurylamine, tetrahydrofurfurylamine, ethylene diamine, dimethylamine, diethylamine, the dibutylamines, diallylamine, di-n-hexylamine, N-methyl ethylamine, dicyclohexylamine, N-ethyl o-methylcyclohexylamine, dibenzylamine, N-cyclohexyl benzylamine, difurfurylamine, piperidine, morpholine, aniline, beta-naphthylamine, alpha-naphthylamine, toluidine, the anisidines, the phenetidines, p-aminodiphenyl, p-phenylene diamine, N-methyl aniline, N-benzyl aniline, N-isopropyl-alpha-naphthylamine, N-furfuryl-beta-naphthylamine, dimethyl aniline, trimethylamine, diphenylamine, phenyl-beta-naphthylamine, diaminodiphenylmethane, pyridine and the like.

Applicant's co-pending application Serial No. 517,106, filed January 5, 1944, now abandoned is directed to the use of the compounds of the present invention in the vulcanization of rubber, while application Serial No. 517,107, filed January 5, 1944, Patent Number 2,386,111, issued March 12, 1945, is directed to a method for preparing certain of the compounds.

What I claim is:

1. As a new composition of matter, a compound conforming to the structural formula

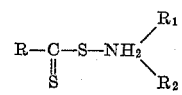

in which R is furyl, R₁ is selected from the group consisting of aliphatic and aromatic radicals and R₂ is selected from the group consisting of aliphatic radicals and hydrogen.

2. As new compositions of matter, the primary aliphatic amine salts of dithiofuroic acid.

3. As new compositions of matter, the primary aromatic amine salts of dithiofuroic acid, 4. As new compositions of matter, the di-aliphatic amine salts of dithiofuroic acid.

ALBERT F. HARDMAN.

REFERENCES CITED

The following references are of record in the file of this patent:

UNITED STATES PATENTS

| Number | Name | Date |
|---|---|---|
| 2,150,422 | Cramer | Mar. 4, 1939 |
| 2,185,220 | Nabenhauer | Jan. 2, 1940 |
| 2,256,157 | Watt | Sept. 16, 1941 |